US008691178B2

United States Patent
Forrest et al.

(10) Patent No.: US 8,691,178 B2
(45) Date of Patent: Apr. 8, 2014

(54) PURIFICATION OF CARBON NANOTUBES USING AGAROSE COLUMN AND DENSITY GRADIENT ULTRACENTRIFUGATION

(75) Inventors: Stephen R. Forrest, Ann Arbor, MI (US); Jeramy D. Zimmerman, Ann Arbor, MI (US)

(73) Assignee: The Regents of The University of Michigan, Ann Arbor, MI (US)

( * ) Notice: Subject to any disclaimer, the term of this patent is extended or adjusted under 35 U.S.C. 154(b) by 192 days.

(21) Appl. No.: 13/153,382

(22) Filed: Jun. 3, 2011

(65) Prior Publication Data

US 2012/0177560 A1 Jul. 12, 2012

Related U.S. Application Data

(60) Provisional application No. 61/396,860, filed on Jun. 3, 2010.

(51) Int. Cl.
*D01F 9/12* (2006.01)
*B82Y 40/00* (2011.01)
*B82Y 30/00* (2011.01)

(52) U.S. Cl.
USPC ........ 423/447.1; 23/293 R; 977/742; 977/845

(58) Field of Classification Search
USPC ........ 423/447.1–447.3, 445 B; 977/742–754, 977/842–848; 23/293 R
See application file for complete search history.

(56) References Cited

U.S. PATENT DOCUMENTS

2010/0065829 A1 3/2010 Forrest et al.
2010/0278714 A1* 11/2010 Tanaka et al. .............. 423/447.1

OTHER PUBLICATIONS

Tanaka, et al., Simple and Scalable Gel-Based Separation of Metallic and Semiconducting Carbon Nanotubes, Nano Letters 2009; 9(4): 1497-1500.*
Arnold, Michael S., et. al., "Hydrodynamic Characterization of Surfactant Encapsulated Carbon Nanotubes Using an Analytical Ultracentrifuge", www.acsnano.org, published online Oct. 3, 2008, vol. 2, No. 11, 10 pages.
Arnold, Michael S., et. al., "Sorting Carbon Nanotubes by Electronic Structure Using Density Differentiation", www.nature.com/naturenanotechnology, vol. 1, Oct. 4, 2006, 6 pages.
Arnold, Michael S., et. al., "Broad Spectral Response Using Carbon Nanotube/Organic Semiconductor/C60 Photodetectors", Nano Letters 2009, vol. 9, No. 9, 3354-3358, 9 pages.
Sato, H., et. al., "Colloids and Surfaces A: Physicochemical and Engineering Aspects", Colloids and Surfaces A: Psysicochem. Eng. Aspects 322 (2008) 103-107, 5 pages.
Tanaka, Takeshi, et al., "Continuous Separation of Metallic and Semiconducting Carbon Nanotubes Using Agarose Gel", Applied Physics Express 2 (2009) 125002, 3 pages.

* cited by examiner

*Primary Examiner* — Daniel C McCracken
(74) *Attorney, Agent, or Firm* — Reising Ethington P.C.

(57) ABSTRACT

A method of processing bundles of carbon nanotubes (CNTs). Bundles of CNTs are put into a solution and unbundled using sonication and one or more surfactants that break apart and disperse at least some of the bundles into the solution such that it contains individual semiconducting CNTs, individual metallic CNTs, and remaining CNT bundles. The individual CNTs are separated from each other using agarose bead column separation using sodium dodecyl sulfate as a surfactant. Remaining CNT bundles are then separated out by performing density-gradient ultracentrifugation.

13 Claims, 6 Drawing Sheets

PURIFICATION OF CARBON NANOTUBES USING AGAROSE COLUMN AND DENSITY GRADIENT ULTRACENTRIFUGATION

CROSS-REFERENCE TO RELATED APPLICATION

This application claims the benefit of U.S. Provisional Application No. 61/396,860, filed Jun. 3, 2010, the entire contents of which are hereby incorporated by reference.

STATEMENT REGARDING FEDERALLY-SPONSORED RESEARCH

This invention was made under CHE0944098 awarded by the National Science Foundation and W15P7T-08-C-P409 awarded by the U.S. Army Communications-Electronics Command (CECOM). The government has certain rights in the invention.

JOINT RESEARCH AGREEMENT

The claimed invention was made by, on behalf of, and/or in connection with one or more of the following parties to a joint university corporation research agreement: Regents of the University of Michigan, Princeton University, The University of Southern California, and the Universal Display Corporation. The agreement was in effect on and before the date the claimed invention was made, and the claimed invention was made as a result of activities undertaken within the scope of the agreement.

TECHNICAL FIELD

The invention relates to sorting of carbon nanotubes (CNTs) by electronic type (i.e., metallic vs. semiconducting).

BACKGROUND OF THE INVENTION

Carbon nanotubes (CNTs) can have different electronic properties based at least in part on their physical structure. For example, the chirality of a single-walled CNT (SWNT) impacts the conductivity of the tube, such that it may be either metallic or semiconducting. Different types of CNTs can have uses for different applications; for example, photovoltaic and photoelectric devices using semiconducting CNTs are known from US Patent Application Publication No. 2010/0065829A1 (hereinafter Ref. [1]). Efficient and/or proper operation of the CNT-based device may depend on the purity of CNTs used so that, for example, the presence of even a small percentage of metallic CNTs in a batch of semiconducting CNTs used for a particular application may undesirably affect the device's operation.

Bulk methods for creating CNTs result in the production of both semiconducting and metallic CNTs in a ratio of approximately one part metallic for two parts semiconducting. For at least some practical applications of CNTs as noted above, it may be beneficial or even necessary to separate these two types of CNTs so as to isolate the desired electrical type. Further complicating this separation is the fact that CNTs tend to bundle together due to Van der Waals force.

One known method involves the use of density-gradient ultracentrifugation (DGU) which physically separates the metallic and semiconducting CNTs into different density layers. Bundles of CNTs, aggregates, and insoluble material present in the solution sediment out to lower levels (higher density) in the gradient. See M. Arnold et al., "Sorting carbon nanotubes by electronic structure using density differentiation," Nature Nanotechnology 60, Vol. 1, October 2006 pp. 60-65 (hereinafter Ref. [2]).

Another known method for separating metallic and semiconducting CNTs involves first sonicating the bulk-produced CNTs using sodium dodecyl sulfate (SDS) to obtain some singly-dispersed CNTs along with some bundles of CNTs, ultracentrifuging to sediment out large bundles and impurities, and then using a chromatography column with an agarose gel bead stationary phase to filter out the semiconducting CNTs. The semiconducting CNTs were then eluted from the agarose beads using sodium deoxycholate. See T. Tanaka et al., "Continuous Separation of Metallic and Semiconducting Carbon Nanotubes Using Agarose Gel," Appl. Phys. Express 2 (2009) 125002 (hereinafter Ref. [3]). Refs. [1], [2], and [3] are hereby incorporated by reference.

These methods of isolating individual CNTs of a particular electronic type are somewhat limited in their ability to obtain highly purified nanotubes. For devices that utilize one electronic type, this purity may be important or may impact efficiency or other performance parameters of the end device.

SUMMARY OF THE INVENTION

According to one aspect of the invention, there is provided a method of processing carbon nanotubes (CNTs) that include individual CNTs and bundles of CNTs. The method includes the steps of (a) carrying out a first processing step that at least partially separates individual metallic CNTs from individual semiconducting CNTs; and (b) carrying out a second processing step that at least partially separates one or more bundles of CNTs from individual metallic and/or semiconducting CNTs. These two steps can be carried out in either order. In some embodiments, step (a) is carried out using agarose bead column separation and step (b) is carried out using density-gradient ultracentrifugation.

According to another aspect of the invention, there is provided a method of processing a starting solution of carbon nanotubes (CNTs) that include individual CNTs and bundles of CNTs. The method includes the steps of: (a) separating the individual CNTs into a first solution primarily containing semiconducting CNTs and a second solution primarily containing metallic CNTs using chromatography column separation; and (b) separating the bundles of CNTs from at least some of the individual CNTs. The two steps can be carried out in any order.

According to yet another aspect of the invention, there is provided a method of processing bundles of carbon nanotubes (CNTs). The method includes the steps of: (a) unbundling bundles of carbon nanotubes (CNTs) into a solution using sonication and one or more surfactants that at least partially break apart and disperse into the solution some or all of the bundles such that the solution contains individual semiconducting CNTs, individual metallic CNTs, and remaining CNT bundles containing both semiconducting and metallic CNTs; (b) separating the individual CNTs into a first solution primarily containing metallic CNTs and a second solution primarily containing metallic CNTs using agarose bead column separation of a starting solution containing sodium dodecyl sulfate and the individual CNTs and remaining CNT bundles produced in step (a); (c) performing density-gradient ultracentrifugation on at least one of the solutions; and (d) extracting from the density-gradient ultracentrifugation a solution of singly-dispersed CNTs that comprise at least 97% of either metallic CNTs or semiconducting CNTs.

BRIEF DESCRIPTION OF THE DRAWINGS

Preferred exemplary embodiments of the invention will hereinafter be described in conjunction with the appended drawings, wherein like designations denote like elements, and wherein.

DETAILED DESCRIPTION OF THE PREFERRED EMBODIMENTS

Figure 1:
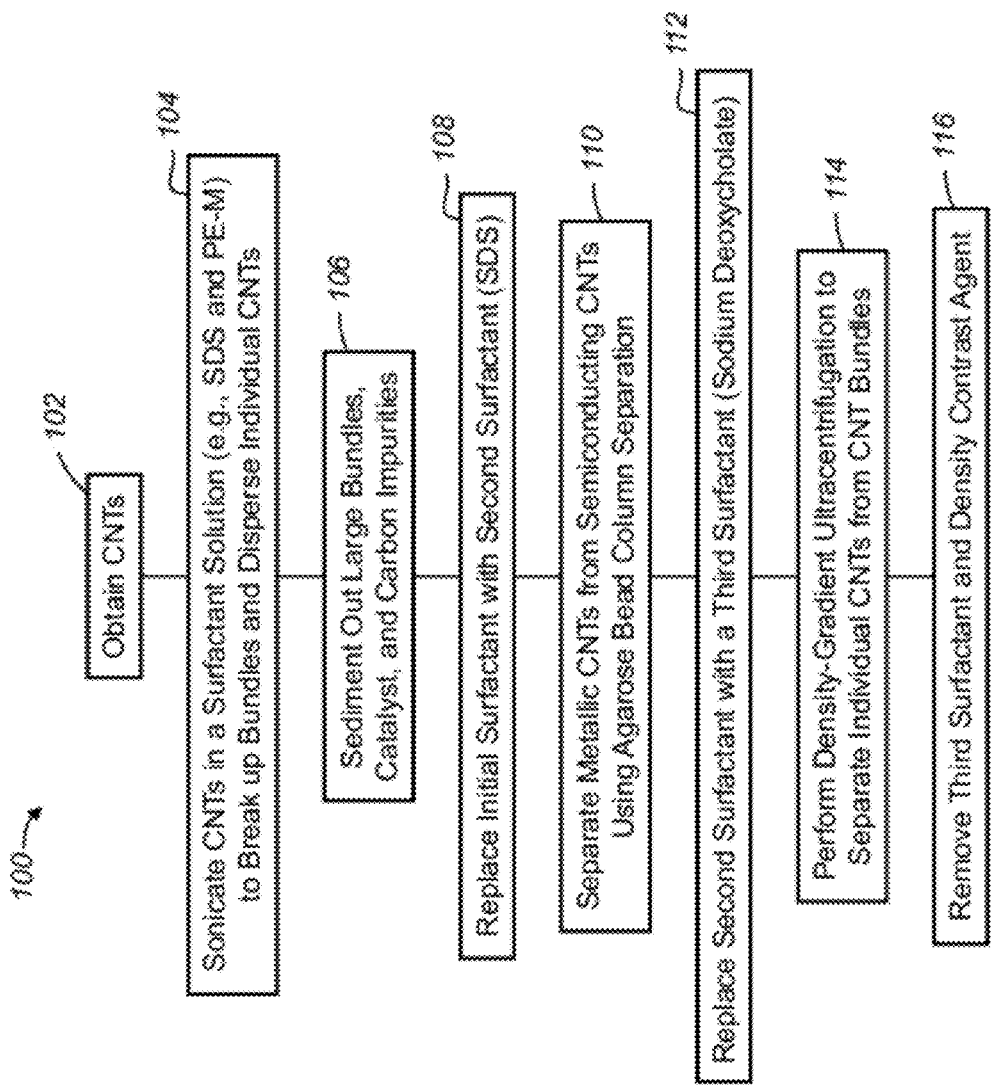
FIG. 1 is is a flow chart depicting steps used in a two-part CNT separation process described below.

Referring first to FIG. 1, there is shown a method 100 of processing CNTs which can be used to isolate out individual CNTs of a desired electronic type; e.g., singly-dispersed metallic CNTs or singly-dispersed semiconducting CNTs. The method involves a two-part process that includes distinct sequential steps of separating CNTs based on electronic type for one step and based on whether they are individual or bundled. While disclosed herein primarily as it would be applied to typical single walled CNTs, it will be appreciated that the methods discussed below can be utilized for various other types of CNTs and other nanotubes; for example, for CoMoCAT or $TIO_2$ nanotubes.

Initially, the process involves obtaining CNTs at step 102, and this can be done by acquiring the CNTs commercially or from another source, or by producing the CNTs in any suitable manner, such as by a high pressure carbon monoxide (HiPCO) process, arc discharge, laser ablation, or chemical vapor deposition (CVD), all of which are known in the art. Bulk produced CNTs generally bundle together such that a starting batch of CNTs will include if not be mostly composed of bundled CNTs. Also, depending on the chirality of each tube itself, the bulk produced CNTs will include both metallic and semiconducting tubes, with the bundles typically including both electronic types.

To separate the bundles into individual tubes, the CNTs are placed into a solution that includes at least one surfactant that is used to disperse the CNTs when they are unbundled and maintain them as individual, singly-dispersed CNTs. As indicated in step 104, this unbundling can be carried out by sonicating the CNTs in the surfactant solution. The CNTs may be sonicated at high power for a long duration to separate a significant portion of the CNTs into singly-dispersed CNTs. Examples of suitable ionic surfactants include sodium laurel sulfate, sodium dodecyl sulfate, sodium cholate, sodium deoxycholate, sodium dodecylbenzene sulfonate, and/or cetyl trimethyl ammonium bromide. Examples of suitable non-ionic surfactants include Tween-20 or TritonX-100. Any one of these surfactants can be used alone or in combination with one or more other surfactants or other additives. This sonication can be aided with the use of a defoaming agent such as a Poly(propylene glycol) monobutyl ether (PE-M). The surfactant solution used can be any one or more suitable surfactants; for example, a mixture of 2% SDS+PE-M can be used with a probe sonicator to unbundle and disperse the individual and bundles of CNTs.

Once unbundled and dispersed, large bundles, any of the growth catalyst used in making the CNTs, and amorphous carbon impurities can be centrifuged out. This pre-processing of the sonicated CNT solution provides a coarse removal of larger CNT bundles, but leaves behind additional CNT bundles that will include both metallic and semiconducting CNTs. At this point, the CNTs are ready for the primary two-part separation process that generally involves (a) at least partially separating individual metallic CNTs from individual semiconducting CNTs, and (b) at least partially separating one or more bundles of CNTs from individual metallic and/or semiconducting CNTs. These steps (a) and (b) are shown in FIG. 1 and primarily discussed below as being carried out in the listed order; however, it will be appreciated that for at least some embodiments, step (b) can be carried out prior to step (a).

At step 108, if necessary, at least one of the initial surfactants may be replaced with one suitable for use in the chromatography column separation carried out in step 110. Thus, for example, where an antifoaming agent or dispersion assisting compound (e.g. PE-M) is used in the unbundling step, it is desirable to remove it from the solution prior to column separation as it can reduce the efficiency of the step (a) process. This can be done by dialysis as will be known to those skilled in the art. A replacement surfactant is then added to aid in the column separation. Sodium dodecyl sulfate is typically used here but other surfactants such as are noted above may possibly be used.

Figure 2:
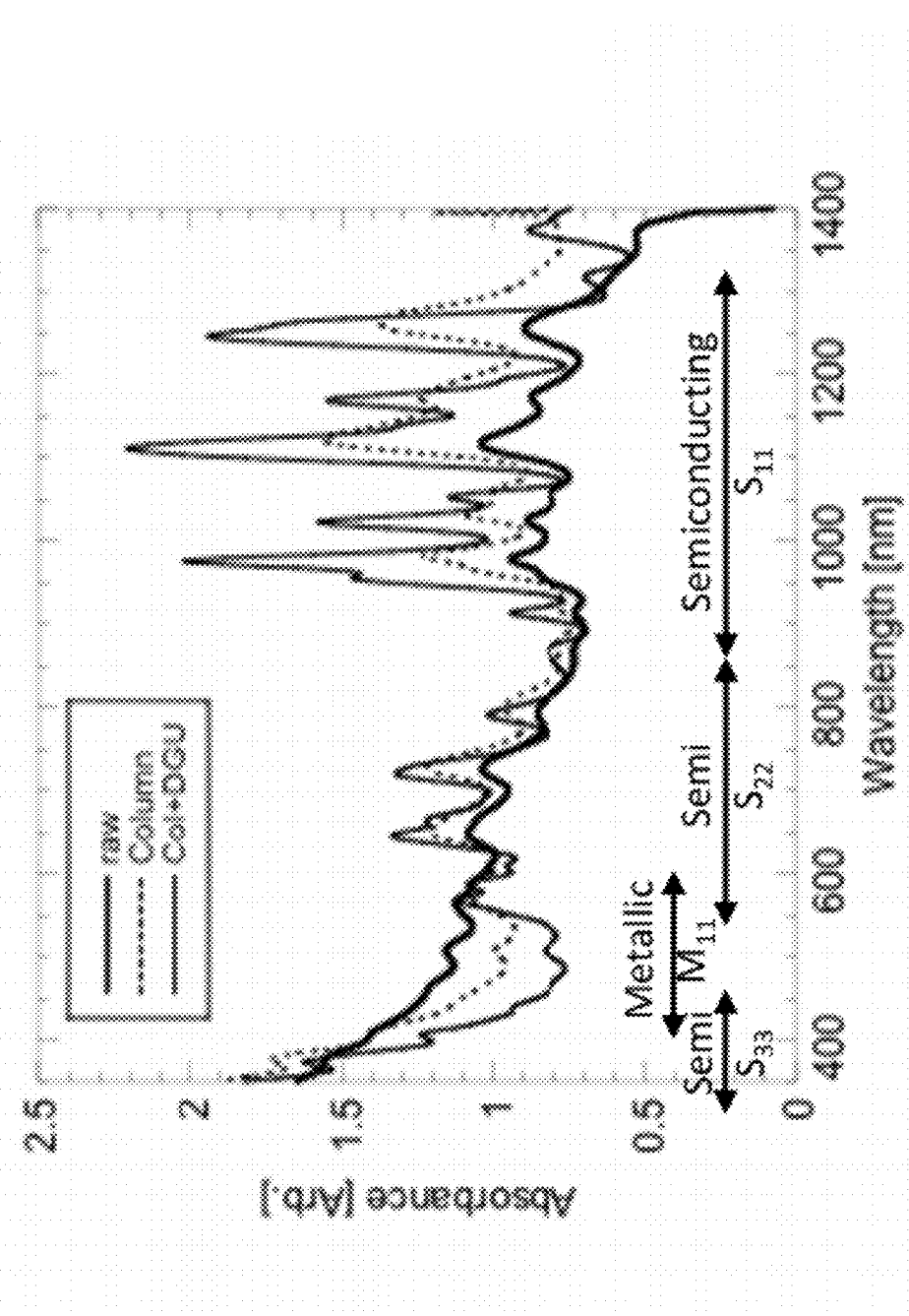
FIG. 2 is a graph showing absorbance of raw and purified semiconducting CNTs at various stages of the CNT separation process of FIG. 1.
Figure 3:
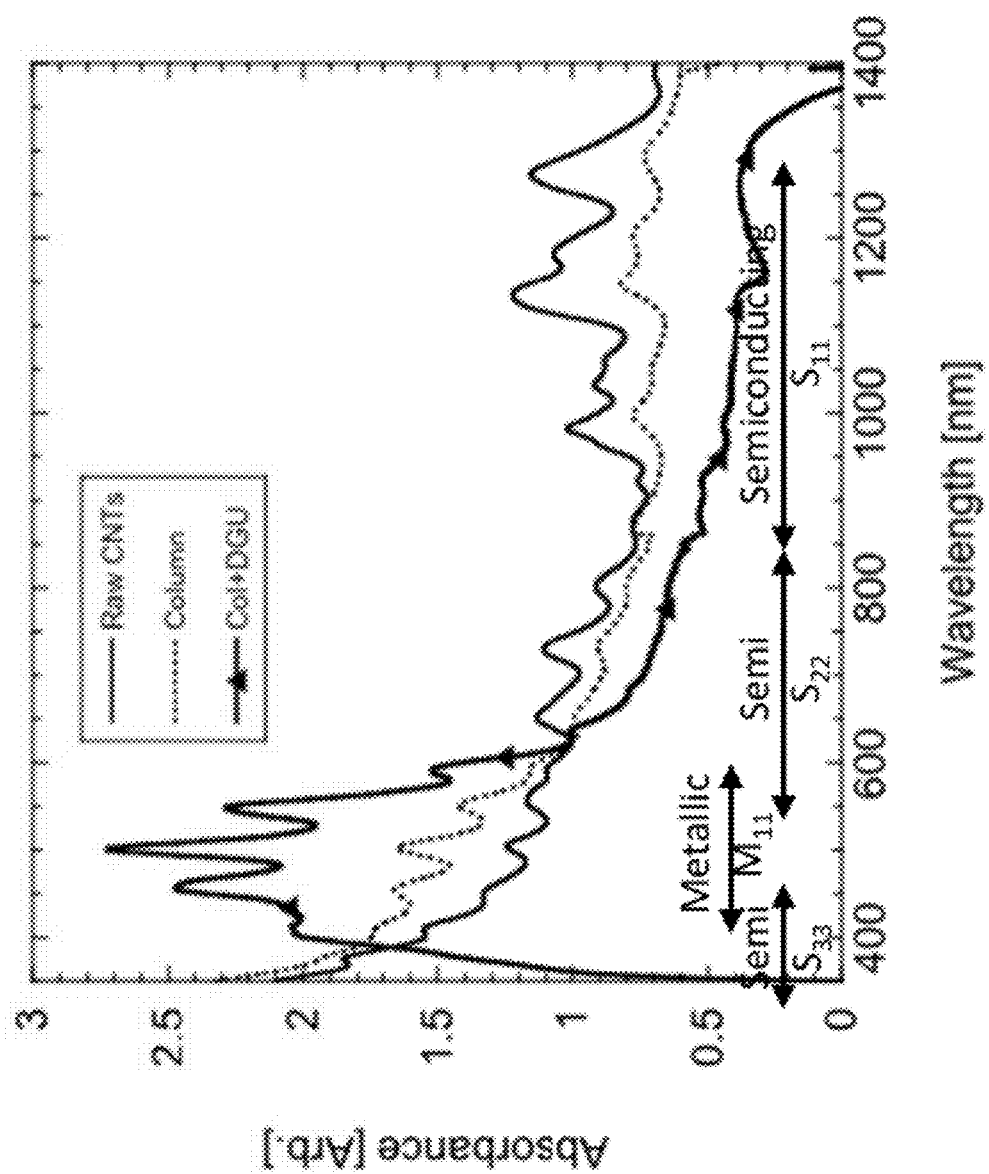
FIG. 3 is a graph showing absorbance of raw and purified metallic CNTs at various stages of the CNT separation process of FIG. 1

At step 110, the step (a) process of separating metallic CNTs from semiconducting CNTs is carried out. Any suitable type of separation process can be used; for example, a chromatography column technique such as agarose bead column separation can be used. The process discussed in Ref. [3] can be used for this and any of the pre-processing steps that are carried out before the step (a) column chromatography. The results of removing metallic CNTs via this agarose bead column separation step is shown in FIG. 2 which shows three absorbance plots: (i) for a suspension of CNTs as dispersed in SDS (Raw); (ii) for the semiconducting CNTs obtained after removing the metallic CNTs via the agarose bead column; and (iii) after removing the remaining bundles of CNTs via density gradient ultracentrifugation (Col+DGU) which will be discussed below in connection with step (b). All absorbance data is normalized to unity at 626 nm. Metallic CNTs from the HiPCO process absorb between 400 and 600 nm ($M_{11}$ transitions), while the semiconducting CNTs absorb below 450 nm ($S_{33}$ and greater transitions) and above 550 nm ($S_{22}$ and $S_{11}$ transitions). As indicated in FIG. 2, the spectral absorbance of the column separated CNT solution (dashed line) reflects a greater relative amount of semiconducting to metallic CNTs than does the raw (not column separated) CNT solution (shown by the thick solid line). Similarly, FIG. 3 shows the results for this same process, except that the separated metallic CNTs are further processed using DGU to remove the bundles and then the absorbance of the purified metallic CNTs was measured. As indicated in FIG. 3, the spectral absorbance of the column separated CNT solution (dashed line) reflects a greater relative amount of metallic to semiconducting CNTs than does the raw (not column separated) CNT solution (shown by the plain solid line).

This column separation of CNTs by electronic type can be used to obtain separate batches of partially purified metallic CNTs and partially purified semiconducting CNTs. For example, this process may be used to produce a first solution primarily containing metallic CNTs and a second solution primarily containing semiconducting CNTs. Depending on the end use of the CNTs (e.g., in producing a photoactive device or for some other use), one or both of these first and second solutions can be further purified using the step (b) method shown in step 114 of FIG. 1.

Figures 4A, 4B:
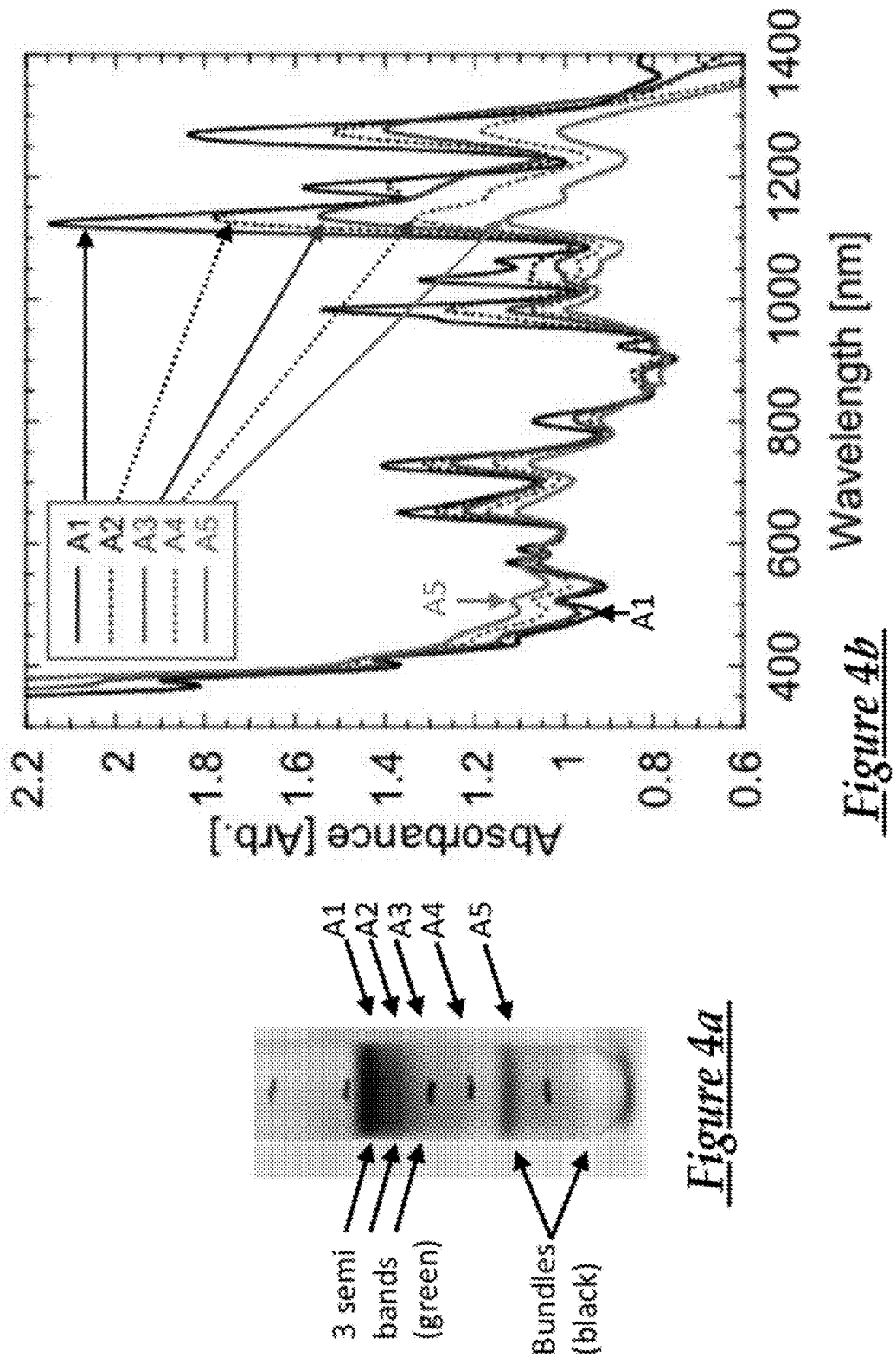
FIG. 4*a* is an image of a centrifugation tube showing the separation of CNTs and CNT bundles following DGU of a solution of primarily semiconducting CNTs following column separation that removes the metallic CNTs.
FIG. 4*b* is a graph showing the spectral absorbance of the CNTs and CNT bundles within the DGU solution at various layers shown in FIG. 4*a*.

The step (b) process is used to separate the individual CNTs (whether metallic or semiconducting, or both if done before step (a)) from the remaining bundles of CNTs. This can be carried out using density-gradient ultracentrifugation (DGU), although any other suitable technique can be used. To prepare the solution for DGU, the surfactant used in the column separation is replaced, if necessary, with one suitable for use in the DGU process. For example, where SDS is used for agarose bead column separation, it can be removed using dialysis and replaced with sodium deoxycholate. A density gradient is formed in the centrifuge tube using different concentrations of a density contrast agent such as iodixanol along with the surfactant and water to make the various layers used in the DGU process. Layers containing CNTs are added near the top of the centrifuge tube so that the individual CNTs and CNT bundles with settle to different layers within the centrifugation tube during centrifugation. For example, this can be done by layering solutions ranging from 25-40% iodixanol to 0% iodixanol (with the remainder water, surfactant, and CNTs). FIG. 4a depicts a centrifuge tube after DGU using the second solution that primarily contains the column-separated semiconducting CNTs. As shown, the uppermost layer (A1) containing CNTs has the highest purity as shown in FIG. 4b by the low absorbance of that layer around 500 nm relative to the higher absorbance at >600 nm. Layer A1 consists primarily of singly dispersed CNTs, whereas A2 through A5 are bundles of progressively larger (and thus more dense) CNT bundles, as evidenced by the increased metallic absorption around 500 nm and larger full width half maximum. Layer A5 containing CNT bundles is observed at a very large density and has absorbance similar to that of raw HiPCO tubes.

Figure 5:
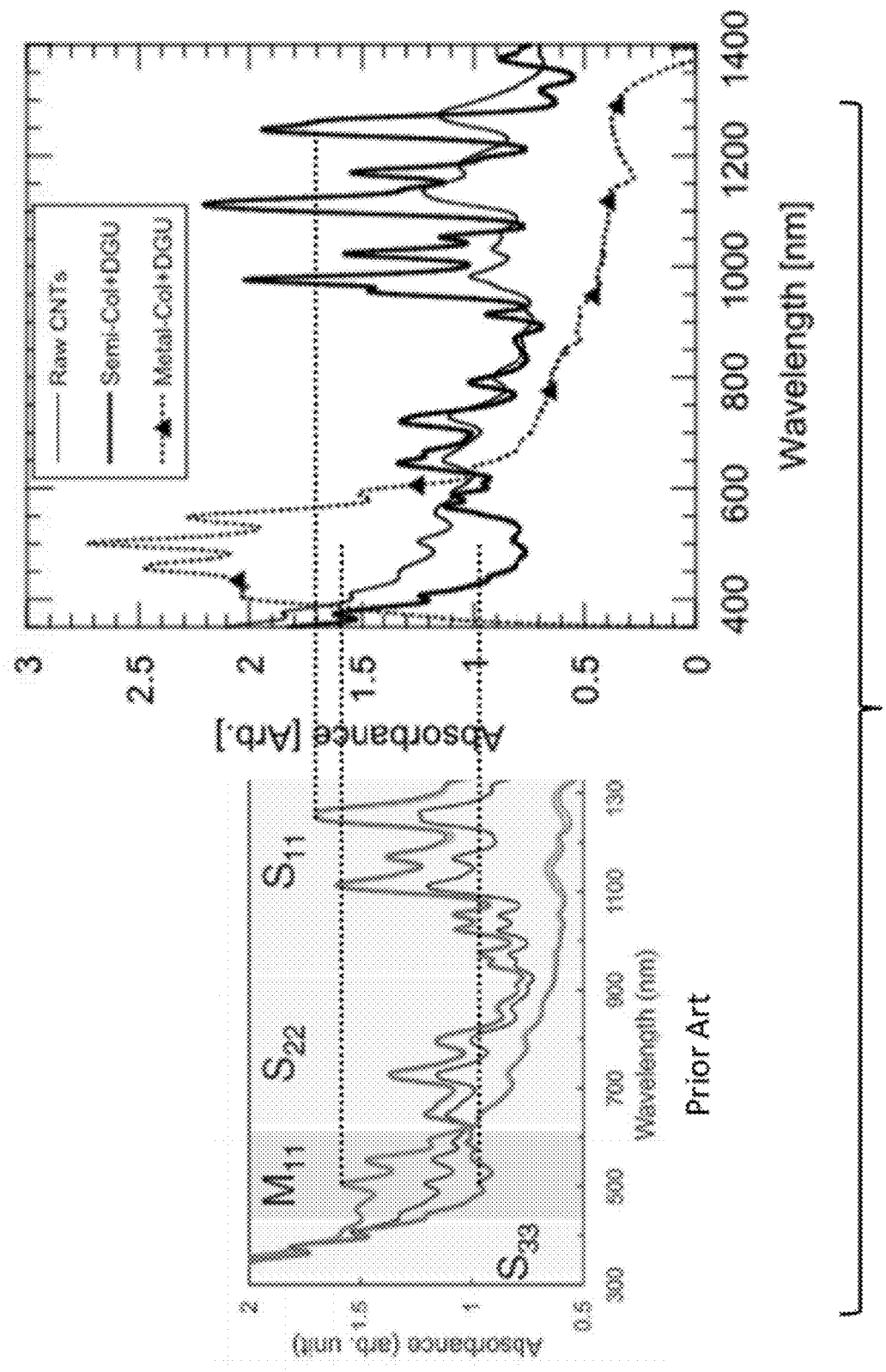
FIG. 5 shows two spectral absorbance graphs normalized and scaled to each other for comparison of the purity of separated semiconducting CNTs and separated metallic CNTs using the two-part CNT separation process versus that of a known prior art process.

The higher purity layer(s) can be extracted from the DGU solution, yielding >97% purity in the extracted individual (either metallic or semiconducting CNTs). FIG. 5 compares the purity of results of the aforementioned process (right-side graph) with that of the prior art process disclosed in Ref. [3]. These graphs are both normalized at 626 nm and scaled the same. As indicated by the connecting dashed lines, the corresponding absorbance of metallic CNTs processed by the two-part method described above indicates a higher purity than that of the prior art. Similarly, the corresponding absorbance of semiconducting CNTs processed by the two-part method described above also indicates a higher purity than that of the prior art.

Figure 7:
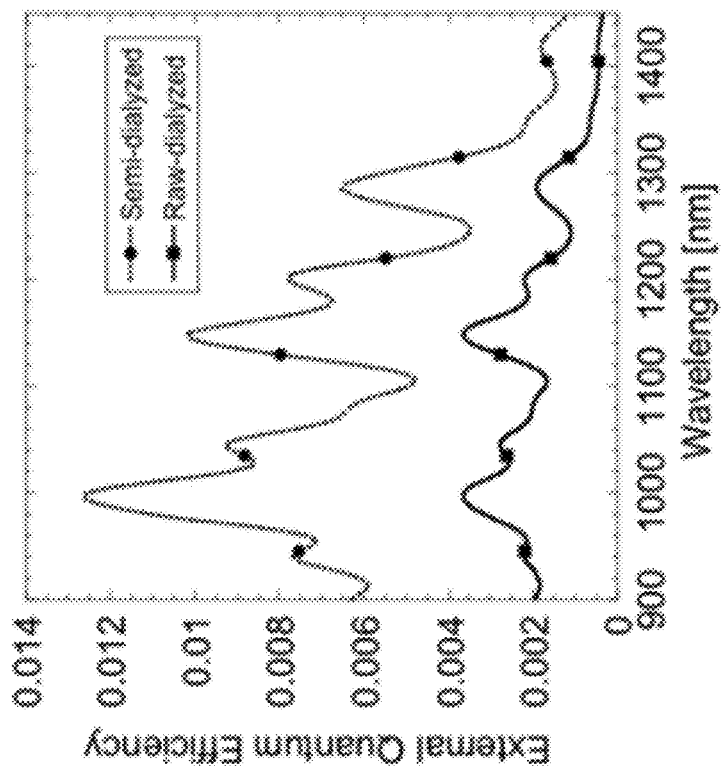
FIG. 7 is a graph showing a comparison of the quantum efficiency of the photodetectors that were made from purified (Semi-dialyzed) and unpurified (Raw-dialyzed) semiconducting CNTs.
Figure 6:
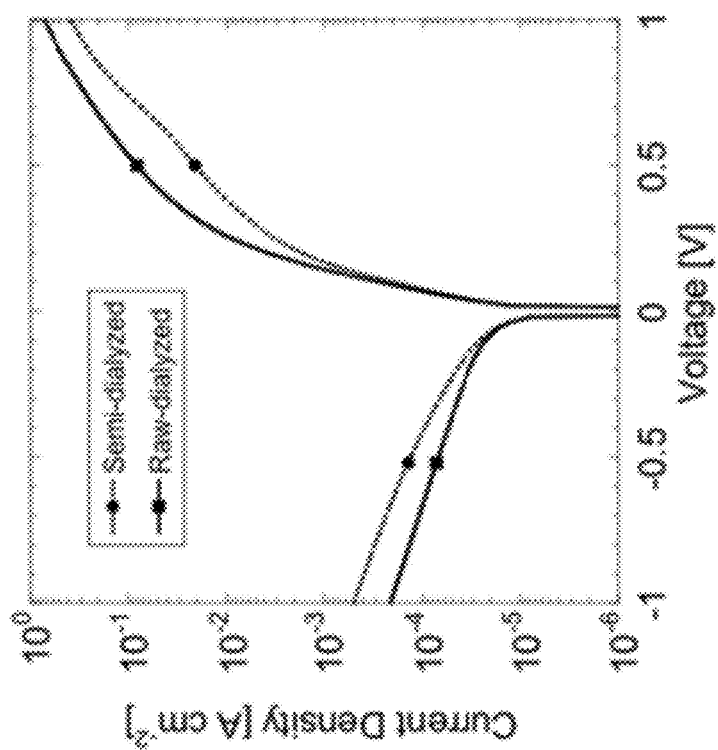
FIG. 6 is a graph showing a comparison of current voltage characteristics for photodetectors made from purified (Semi-dialyzed) and unpurified (Raw-dialyzed) semiconducting CNTs.

The purified CNTs can be used to produce various useful devices, such as photodetectors. As an example and for comparative purposes, photodetectors using purified CNTs consisting of >95% semiconducting CNTs show similar current voltage characteristics to devices made with unpurified CNTs; this is shown in FIG. 6. However, the quantum efficiency of the device with purified CNTs is over three times that of a device made with unpurified CNTs; this is shown in FIG. 7. All CNTs in these devices were treated identically except that the device labeled "Raw-dialyzed" was not passed through an agarose bead purification column as described earlier and thus contains about 33% metallic tubes whereas the the Semi-dialyzed sample contains <10% metallic CNTs. CNTs were sonicated to disperse in sodium dodecyl sulfate, ran through a column purification (not performed for raw tubes), dialyzed to be dispersed with sodium deoxycholate, separated in a density gradient (DGU), dialyzed to remove the iodixanol from the density gradient medium, the surfactant removed via dialysis to aid in filtration of the CNTs, the CNTs were filtered out of solution, redispersed via sonication into 3 mg/ml poly-3-hexylthiophene (P3HT) in chlorobenzene solution, centrifuged at 15,000 g, and the primarily singly-dispersed CNT-containing supernate collected. The device was fabricated on commercial indium tin oxide coated glass substrates. A ~40 nm thick layer of polymer wrapped CNTs was doctor bladed onto the substrate and ~800 Å of $C_{60}$ was thermally evaporated onto the polymer-wrapped CNT layer followed by 1001 of bathocuproine (BCP), and finally 1000 Å of Ag was evaporated through a shadow mask to define the contacts.

It is to be understood that the foregoing description is not a definition of the invention, but is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. For example, a simple DGU can be performed where the only sorting expected is based on if there are any bundles or not. This can be used to prepare CNTs for the DGU process described above where separation is based on electronic structure (metallic v. semiconducting). Also, at least steps 108 and 112 are optional depending on the selection and use of surfactants for a particular implementation of the method described herein. All such other embodiments, changes, and modifications are intended to come within the scope of the appended claims.

As used in the claims, any phrase using an either/or construction is to be construed as an exclusive OR (XOR), such that, for example, "either A or B" is to be construed to include both of the following: (i) A but not B, (ii) B but not A; and is to be construed so as to exclude both A and B. Also as used in the claims, the term "or" when not used in an either/or construction is meant in the sense of a logical OR rather than as an exclusive OR (XOR), unless otherwise required in a particular claim to provide a reasonable construction of that claim. Thus, by way of example, "A or B" includes any of the following: (i) A but not B, (ii) B but not A, (iii) both A and B. The term "and/or" may also be used herein in this same sense as a logical OR having the same meaning as "or". These same constructions of these terms applies to their use in the specification unless the context in which the term is used requires otherwise.

As used in this specification and claims, the terms "e.g.," "for example," "for instance," "such as," and "like," and the verbs "comprising," "having," "including," and their other verb forms, when used in conjunction with a listing of one or more components or other items, are each to be construed as open-ended, meaning that that the listing is not to be considered as excluding other, additional components or items. Other terms are to be construed using their broadest reasonable meaning unless they are used in a context that requires a different interpretation.

The invention claimed is:

1. A method of processing carbon nanotubes (CNTs) that include individual CNTs and bundles of CNTs, comprising the steps of:
   (a) carrying out a first processing step that at least partially separates individual metallic CNTs from individual semiconducting CNTs; and
   (b) carrying out a second processing step that at least partially separates one or more bundles of CNTs from individual metallic and/or semiconducting CNTs;
   the method further comprising, prior to steps (a) and (b), the steps of:
   at least partially unbundling some of the bundles of CNTs into individual CNTs and dispersing the individual CNTs and remaining bundles of CNTs in a solution using one or more surfactants to thereby provide the individual metallic CNTs, the individual semiconducting CNTs, and the one or more bundles of CNTs; and
   replacing at least one of the one or more surfactants with a different surfactant, wherein the replacing step further comprises removing an antifoam agent or dispersion assisting compound from the solution using dialysis.

2. The method of claim 1, wherein step (a) comprises separating the individual CNTs into a first solution containing metallic CNTs and into a second solution containing semiconducting CNTs, wherein the first and second solutions contain bundles of CNTs and wherein step (b) comprises processing at least one of the solutions by removing at least some of the bundles of CNTs from the solution.

3. The method of claim 2, wherein step (b) further comprises processing the first solution by removing at least some of the bundles of CNTs from the first solution, wherein at least 97% of the CNTs remaining after steps (a) and (b) comprise metallic CNTs.

4. The method of claim 2, wherein step (b) further comprises processing the second solution by removing at least some of the bundles of CNTs from the second solution, wherein at least 97% of the CNTs remaining after steps (a) and (b) comprise semiconducting CNTs.

5. The method of claim 1, wherein step (a) further comprises forming a solution containing the CNTs and sodium dodecyl sulfate and processing the solution using agarose bead column separation of the individual metallic CNTs from the individual semiconducting CNTs.

6. The method of claim 1, wherein step (b) is carried out using density-gradient ultracentrifugation.

7. The method of claim 6, wherein step (b) further comprises carrying out the density-gradient ultracentrifugation using various mixtures of iodixanol, water, and a surfactant.

8. The method of claim 1, wherein the one or more surfactants comprises an ionic surfactant and the unbundling step comprises unbundling some of the bundles of CNTs using sonication.

9. The method of claim 8, wherein the ionic surfactant comprises sodium laurel sulfate, sodium dodecyl sulfate, sodium cholate, sodium deoxycholate, sodium dodecylbenzene sulfonate, and/or cetyl trimethyl ammonium bromide.

10. The method of claim 1, wherein the different surfactant comprises sodium dodecyl sulfate and wherein step (a) further comprises using agarose bead column separation of the individual metallic CNTs from the individual semiconducting CNTs.

11. The method of claim 1, further comprising the step of replacing the different surfactant with another different surfactant between steps (a) and (b).

12. The method of claim 1, wherein the one or more surfactants in the unbundling step comprises a non-ionic surfactant, wherein the unbundling step comprises unbundling some of the bundles of CNTs using sonication, and wherein the method further comprises replacing the non-ionic surfactant with an ionic surfactant prior to step (a).

13. A method of processing bundles of carbon nanotubes (CNTs), comprising the steps of:
   (a) unbundling bundles of carbon nanotubes (CNTs) into a solution using sonication and one or more surfactants that at least partially break apart and disperse into the solution some or all of the bundles such that the solution contains individual semiconducting CNTs, individual metallic CNTs, and remaining CNT bundles containing both semiconducting and metallic CNTs;
   (b) separating the individual CNTs into a first solution primarily containing metallic CNTs and a second solution primarily containing metallic CNTs using agarose bead column separation of a starting solution containing sodium dodecyl sulfate and the individual CNTs and remaining CNT bundles produced in step (a);
   (c) performing density-gradient ultracentrifugation on at least one of the solutions; and
   (d) extracting from the density-gradient ultracentrifugation a solution of singly-dispersed CNTs that comprise at least 97% of either metallic CNTs or semiconducting CNTs.

* * * * *